United States Patent [19]

Mischke

[11] Patent Number: 4,526,111

[45] Date of Patent: Jul. 2, 1985

[54] NOZZLE FOR A FLUIDIZED BED FIRING SYSTEM

[75] Inventor: Walter Mischke, Herne, Fed. Rep. of Germany

[73] Assignee: Deutsche Babcock Aktiengesellschaft, Oberhausen, Fed. Rep. of Germany

[21] Appl. No.: 497,020

[22] Filed: May 23, 1983

Related U.S. Application Data

[63] Continuation of Ser. No. 236,787, Feb. 23, 1981, abandoned.

[30] Foreign Application Priority Data

May 23, 1980 [DE] Fed. Rep. of Germany ....... 3019701

[51] Int. Cl.³ .......................... F23G 5/00; B05B 1/26
[52] U.S. Cl. ................................. 110/245; 239/515; 406/157; 432/58; 34/57 A
[58] Field of Search ................ 239/499, 500, 513–515; 406/157, 163, 174; 432/15, 58; 431/7, 170; 110/245, 263, 346, 347; 34/57 A; 98/42 R, 66 R

[56] References Cited

U.S. PATENT DOCUMENTS

| | | | |
|---|---|---|---|
| 3,423,840 | 1/1969 | Beeken | 34/57 A |
| 4,096,640 | 6/1978 | Krambrock et al. | 34/57 A |
| 4,309,948 | 1/1982 | Zielinski | 110/263 |

FOREIGN PATENT DOCUMENTS

| | | | |
|---|---|---|---|
| 197705 | 5/1977 | U.S.S.R. | 406/163 |
| 197707 | 7/1977 | U.S.S.R. | 34/57 R |
| 663963 | 5/1979 | U.S.S.R. | 431/170 |

Primary Examiner—Andres Kashnikow
Assistant Examiner—James R. Moon, Jr.
Attorney, Agent, or Firm—Max Fogiel

[57] ABSTRACT

A nozzle for a fluidized bed firing system in which a pipe for transporting coal/air mixture has an end surrounded by a hood. This pipe extends into the fluidized bed, and an axial exit opening is located between the hood and the pipe. The pipe, moreover, is provided with that axial exit opening, while the hood is spaced from this exit opening. A deflecting face, moreover, is located in a vicinity opposite to the exit opening. A downwardly-pointing baffle is attached underneath a lower edge of the hood, to the pipe so as to be adjustable in height. The deflecting face may be in the form of a cone with a tip pointing towards the exit opening of the pipe. The hood may be provided, furthermore, with a hemispherical cap.

5 Claims, 2 Drawing Figures

NOZZLE FOR A FLUIDIZED BED FIRING SYSTEM

This is a continuation, of application Ser. No. 236.787 filed Feb. 23, 1981, now abandoned.

BACKGROUND OF THE INVENTION

The present invention relates to a nozzle for a fluidized bed firing system, in which a hood surrounds that end of a coal/air mixture transport pipe which extends into the fluidized bed. An axial exit cross-section is present between the hood and the pipe.

Such a nozzle allows the mass stream to be directed towards the bottom of the fluidized bed. During an interruption of operation, the whirled-up bed material is, moreover, prevented from trickling backwardly into the pipe. The pipes of prior art nozzles of this kind (DE-OS 23 35 514; German application laid open to public inspection before an examination) are provided with lateral openings. This design presents some disadvantages. To quote examples: the dust contained in the mixture causes wear to the hood wall which is situated oppositely to the lateral openings of the pipe. As the cross-section of the openings is smaller than the pipe cross-section, throttling occurs during the exit from the openings.

The present invention pursues the object of altering the flow conditions so as to avoid the disadvantages inherent in a nozzle of the aforementioned kind.

Another object of the present invention is to provide an arrangement of the foregoing character which is substantially simple in construction and may be economically fabricated.

A further object of the present invention to to provide an arrangement, as described, which may be readily maintained in service and which has a substantially long operating life.

SUMMARY OF THE INVENTION

According to the present invention, the objects are achieved by providing the pipe with an axial exit opening, by arranging the hood at a distance from this exit opening, and by accommodating a deflecting face in the area which is situated oppositely to the exit opening.

This nozzle presents the advantages of the prior art nozzles, but has additionally the feature of allowing a good deflection of the mixed stream is the space between hood and pipe. Wear resistance of the face where the mixed stream impinges onto the hood may be achieved in a simple manner. The cross-section of the axial exit opening which replaces the lateral openings corresponds to the cross-section of the pipe, so that throttling cannot occur any longer. In contrast to the arrangement with lateral openings it is, moreover, possible to empty the pipe completely through the axial exit opening during an interruption of operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
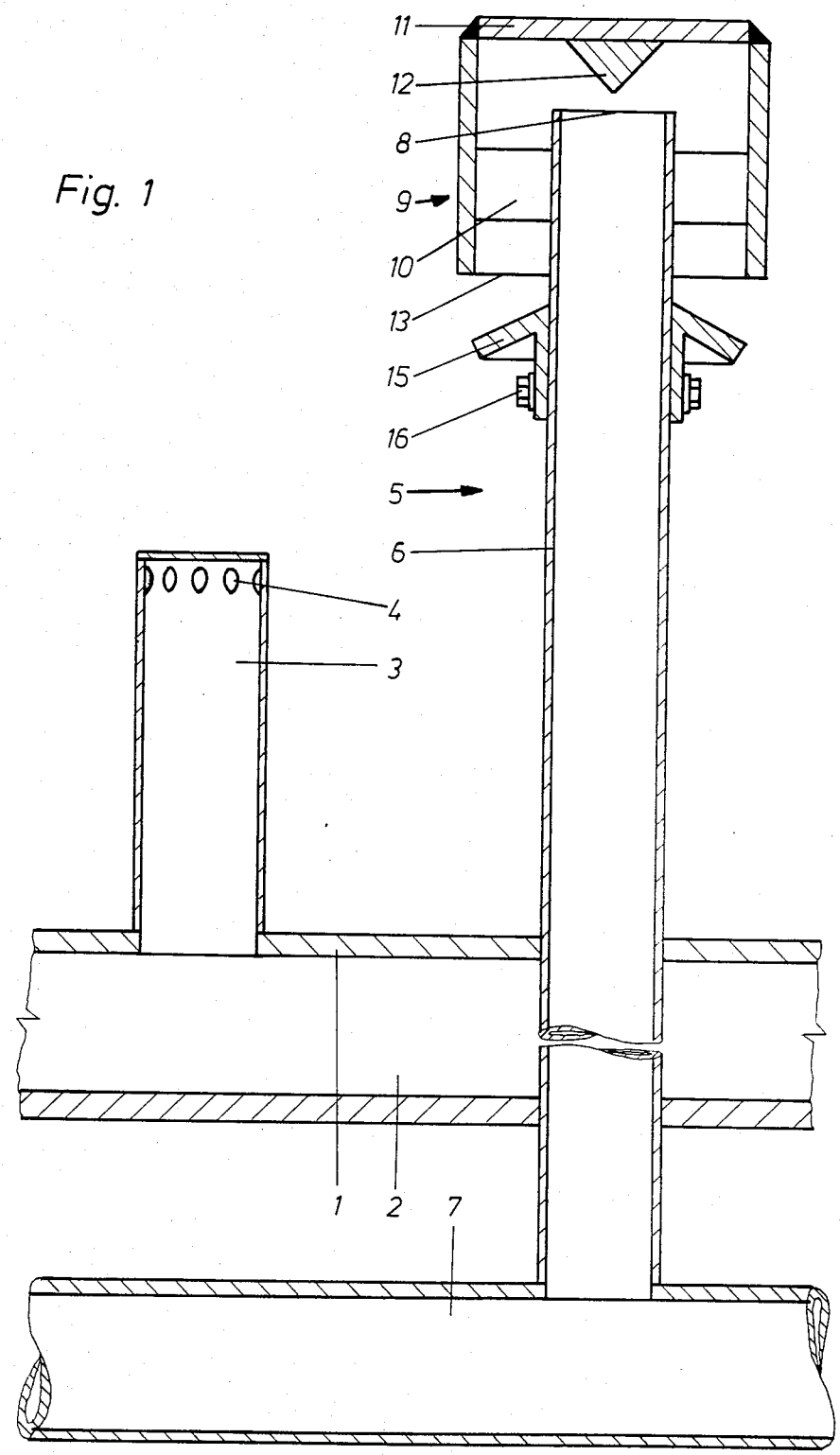
FIG. 1 shows the longitudinal section through part of a fluidized bed firing system provided with a nozzle according to the present invention.

The fluidized bed firing system contains a combustion chamber with a bottom 1, on which there is bed material consisting of coal and inert substances, such as ash. The heat produced in the combustion chamber is transferred to a heat exchanger bundle arranged within the fluidized bed above bottom 1. A further proportion of the heat produced is utilized in a waste heat boiler following the combustion chamber.

The bed material is fluidized by the injection of air. The air is supplied to an air box 2 arranged underneath bottom 1. A plurality of air nozzles 3 is installed in bottom 1. The air nozzles are closed at their upper ends and are laterally provided with exit drill holes 4.

The coal which is chiefly available in pulverulent form, is introduced into the fluidized bed through nozzles 5 by means of an air carrier. Each nozzle 5 consists of pipe 6 terminating in main 7 which transports a mixture of pulverized coal and carrier air. Pipe 6 passes through air box 2 and extends into the bed material of the fluidized bed. It is provided with an axial exit opening 8.

Pipe 6 of nozzle 5 is surrounded by hood 9 at its end extending into the fluidized bed. Hood 9 is supported on the side walls of pipe 6 by means of webs 10. Under the embodiment represented in FIG. 1, hood 9 is cylindrical in shape and is unilaterally closed by a flat cover 11. A spacing is maintained between the axial exit opening 8 of pipe 6 and cover 11 of hood 9, as well as between the side walls of hood 9 and of pipe 6.

Hood 9 is provided with a deflecting face in opposite arrangement to the exit opening 8 of pipe 6. As shown in FIG. 1, this deflecting face consists of a cone 12 which is attached to cover 11 of hood 9. The tip of cone 12 points to the axial exit opening 8 of pipe 6. The mixture flowing through pipe 6 of nozzle 5 is deflected by the deflecting face which is formed by cone 12; it leaves through the axial exit cross-section 13 situated between hood 9 and pipe 6.

Figure 2:
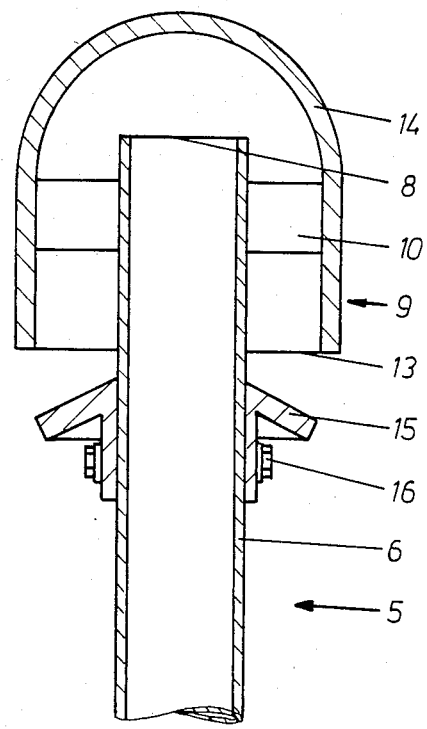
FIG. 2 shows another embodiment of the present invention.

According to Fig. 2, the deflecting face is formed by a hemispherical cap 14 which closes hood 9 at top. The mixed stream leaving the exit opening 8 is deflected by cap 14 so that it leaves again the exit cross-section 13 in axial direction.

Underneath hood 9, there is a baffle 15, the sides of which point downwardly. The distance between baffle 15 and the lower edge of hood 9 corresponds approximately to the width of the axial exit cross section 13. This baffle 15 causes the mixed stream axially leaving the exit cross-section 13 to be deflected into the radial direction. Baffle 15 is attached to pipe 6 by means of screws 16 so as to be adjustable in height. The distance remaining between the lower edge of hood 9 and the baffle 15 may consequently be adjusted to the most favorable operating conditions.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Apparatus with a nozzle for a fluidized bed firing system, comprising in combination: hood means surrounding an end of a coal/air mixture transport pipe; a fluidized bed; said pipe extending into said fluidized bed; and axial exit opening between said hood means and said pipe; said pipe having said axial exit opening, said hood means being spaced from said exit opening; deflecting face means located in a vicinity opposite to said exit opening; and a baffle pointing downwardly, said baffle being attached to said pipe underneath a lower edge of said hood for radially deflecting the flow of the mixture of fuel and air exiting between the hood and said pipe, whereby the coal/air mixture exits between said hood means and said pipe and impinges the baffle, said baffle deflecting the flow direction of said mixture so that the coal is distributed uniformly in the fluidized bed, fluidized material in the bed being prevented from entering feed lines between the baffle and lower edge of said hood means and between said pipe and hood means when air is maintained through the nozzle while coal feed is simultaneously stopped.

2. Apparatus according to claim 1, wherein said baffle is adjustable in height.

3. Apparatus according to claim 1, wherein said deflecting face means comprises cone means having a tip pointing towards said exit opening of said pipe.

4. Apparatus according to claim 1, wherein said hood means has a hemispherical cap.

5. Apparatus according to claim 1, wherein said deflecting face means comprises cone means having a tip pointing towards said exit opening of said pipe, said hood means having a hemispherical cap, said baffle being adjustable in height.

* * * * *